COMPLEMENTARY STORAGE AND DRIVER FLIP-FLOP CIRCUITS

Filed Sept. 26, 1966 4 Sheets-Sheet 1

Fig. I

INVENTORS.
GILBERT B. GERHART
STANLEY J. SAVINESE

BY Joseph P. Kates

ATTORNEY

INVENTORS.
GILBERT B. GERHART
STANLEY J. SAVINESE
BY Joseph P. Kates
ATTORNEY

INVENTORS.
GILBERT B. GERHART
STANLEY J. SAVINESE
BY Joseph P. Kates
ATTORNEY

INVENTORS.
GILBERT B. GERHART
STANLEY J. SAVINESE
BY Joseph P. Kates
ATTORNEY

United States Patent Office 3,524,080
Patented Aug. 11, 1970

3,524,080

COMPLEMENTARY STORAGE AND DRIVER FLIP-FLOP CIRCUITS

Stanley J. Savinese, Ridley Park, and Gilbert B. Gerhart, Plymouth Meeting, Pa., assignors to Burroughs Corporation, Detroit, Mich., a corporation of Michigan Filed Sept. 26, 1966, Ser. No. 581,778
Int. Cl. H03k *3/26*
U.S. Cl. 307—291 21 Claims

ABSTRACT OF THE DISCLOSURE

Complementary storage and driver flip-flop circuits connected for signalling action and information function modes in a display system and being coupled to an action-information selection switch, indicator devices and switching apparatus responsive to succeeding opeartions of a trigger input and to the state of the flip-flops to shift selected ones of them from one state to another.

The present invention relates to flip-flop storage and activating circuits. More particularly, the invention relates to flip-flop circuits serving as action flip-flop circuits and as information flip-flop circuits capable of data storage and of driving lamp indicators in action-information flip-flop circuit pairs in a message display input/output unit operating as part of a modular computer system in conjunction with an automatic message processing system, the whole of which may in turn comprise portions of a global command and control system.

Briefly, the present invention comprises a selectively operable flip-flop circuit which may be associated as one of a pair of an action flip-flop circuit and an information flip-flop circuit of a plurality of pairs of such flip-flop circuits, an action-information switching means common to the plurality of pairs, and a separate switching means for each pair to actuate or activate the flip-flop of a selected pair as determined by the action-information switching means. As used herein "actuate" means the setting up of conditions necessary to permit one to "activate" a device or circuit. Each flip-flop circuit may comprise a pair of complementary transistors which may be caused to conduct or not conduct by a single push button input. A diode feedback network is provided whereby both transistors are On, or both are Off, with one transistor latching the other in the On state. The states of the flip-flop circuits may be observed, sampled, reset, may enable display or other information and/or may enable their own states to be conveyed to and from other portions of the system, and/or to addresses directly or after processing and for action or for information as determined, and may implement information transfer and processing operations in a large scale modular computer system and attendant input/output and communication equipment. The flip-flop circuits may be actuated and/or activated under operator or automatic control of the keyboard of a computer system input/output analyzing unit comprising a display keyboard, a display console and a controller. Means are provided responsive to such actuation and activation to effect conveying of information to and from other portions of the system, and/or to effect sampling of the flip-flop states for further processing of information in the ssytem or for processing and/or communication to addresses for their information or action in an automatic message processing system. Fail-safe safeguard means are also provided so that danger of accidental improper transmission of information is avoided.

The invention thus comprises a plurality of action and a plurality of corresponding information flip-flop circuits. Each one of the flip-flop circuits may comprise an NPN and a complementary PNP flip-flop arranged in circuit configuration such that both are normally Off and may be actuated, activated, sampled and/or reset by small signals of the voltages normally found in computer systems. Each pair of activate-information flip-flop circuits comprises switching means wherein when the switch is set to actuate one of the flip-flop circuits of the pair, it is also in switch position to deactivate the other flip-flop circuit of the pair.

In the inactivated state, both transistors of a single flip-flop circuit are turned off. A push button switching network is provided comprising a capacitor in series with a switch which in a first normally closed switch contact position puts the capacitor in parallel across a negative power supply source and a first resistor, the first resistor being connected in series with a second resistor, an indicator and a positive voltage source, in a voltage dividing arrangement. Upon activating the switch to a second closed contact position by depressing the push button (assuming that proper switching to action or information has accordingly taken place) the charge which is currently stored in the capacitor is applied to one of the transistor circuits to turn the transistor On. A regenerative feedback circuit arrangement is provided such that the second complementary transistor is turned on by the turning on of the first transistor and both transistors remain in the On state or condition until either the push button switch, which had been momentarily engaged, is again momentarily engaged, or until a logical reset input is applied. Successive depressions of the push button apply successive positive and negative voltage to one of the complementary transistors sufficient to cause both transistors of one of the flip-flop circuits to be turned successively On and Off. A number of action-information push buttons in accordance with the number of action-information pairs of flip-flops may be provided and a single action-information switching means may be provided.

The prior art provides devices to drive indicators and provides flip-flop circuits. However, prior art devices proved disadvantageous, or were unable to perform the function provided by the present invention because they consumed standby power, they could not be switched on and off with a single push of a button, and in the case of non-complementary active element types, they did not lend themselves to both transistors being Off or both transistors being On which is desirable to indicate the appropriate state economically.

An example of a device which is unsatisfactory for the purpose of the present invention is that of U.S. Pat. 3,090,-039 for Bistable Indicator Circuit, issued to A. B. Walls on May 14, 1963. While this circuit provides a complementary flip-flop and an indicator light circuit, the circuit requires two switches, it does not lend itself to mutually exclusive operations of two flip-flops from a single switch, and it is not adaptable to re-setting of a plurality of flip-flops.

Another patented device is that of U.S. Pat. 2,840,727 of W. B. Guggi for Self-Locking Transistor Switching Circuit, issued June 24, 1958. This patented circuit provides a complementary transistor circuit with diode feedback, but does not provide indication means and the circuit is structurally unable to perform the required functions of the present invention because its state is dependent upon a continuous short circuit being applied to its input terminals. In the present invention a single momentary depression of a push button switch will cause the circuit to operate and a second push on the same button will cause it to be disenabled.

The device of U.S. Pat. No. 2,963,692 of Barter et al., for Display Device Segments and Circuits Therefor, issued Dec. 6, 1960 includes complementary transistors and an indicating segment. However, this device requires a third transistor to supply the required power to the indicating device. Also, this patented device fails to provide a fundamental requirement for use in a command and control system, that the circuit provide protection against burn-out, and that overload of the lamp may occur without giving a false indication. The usual type of cross-coupled flip-flops are not suitable because they do not provide the feature of the present invention of not consuming substantial power except when utilized. They do not provide the required protective feature in the event of lamp burnout and they are not adaptable for use with a single momentarily depressed switch.

The present invention overcomes these and other disadvantages of the prior art and provides additional advantages in that it is economical of power since it requires minimal or no power unless the actual circuit is being utilized, it provides for protection against overload or burn out of the indicating devices, it provides for foolproof protection wherein two flip-flops may be operated in a mutually exclusive manner, such that only one of them may be activated depending upon the setting of a single switch and the momentary depressing of a button switch, and wherein logical means are provided to sample the current state of all of the flip-flop devices, that is, to sample the information electronically in a very brief period of time such that it may be fed into a computer system substantially automatically in addition to being visually observed, and wherein a substantially optimum circuit utilizing substantially few active elements and substantially few expensive, or bulky components are required.Thus, the present invention enables a large number of elements to be placed upon a single card to accomplish the functions of monitoring a great number of possible information inputs and outputs.

Accordingly, an object of the present invention is to provide a flip-flop unit comprising a minimum of transistors and wherein each flip-flop circuit may comprise two transistors which are both simultaneously on upon activation of the flip-flop circuit.

Another object of the present invention is to provide a flip-flop circuit comprising two transistors which when in Off condition normally do not consume power and which may be momentarily activated to remain On until a single deactuation turns both transistors off.

Another object of the present invention is to provide a flip-flop circuit comprising a pair of transistors normally Off, and which are turned On by a simple actuating circuit comprising a capacitor and a voltage divider network and wherein the circuit may include an indicator to indicate whether the transistors are On or Off.

Another object of the present invention is to provide a flip-flop circuit including an input actuating means comprising an indicator and wherein actuation will not occur if the indicator is disabled.

Still another object of the invention is to provide a flip-flop circuit which will be normally Off and including an indicating device to indicate when the flip-flop is in On condition and wherein means are provided such that two such flip-flop circuits can be mutually controlled and wherein only one of the two flip-flop circuits at a time may be activated into On state by a single switch which may be a switch of the momentarily depressable type.

Yet another object of the present invention is to provide for a plurality of flip-flop circuits and corresponding visual indicator means wherein the states of each of the flip-flop circuits at a particular instant may be instantaneously sampled electronically by observing one of the outputs of the flip-flop circuits independent of the actual state of the indicator means, and wherein the indicator means may be disposed in the input of the flip-flop circuit in such circuit configuration that upon failure of the visual indicating means, the circuit may not be turned on again but its present electronic state may still be ascertained.

Another object of the present invention is to provide a plurality of substantially unilateral current flow active device flip-flop circuits which are in normally Off state without necessity for substantial power consumption and wherein a circuit means is provided sensitive to a single reset pulse, which may be of ordinary computer system signal voltage level magnitude, to enable all of the flip-flop circuits to be reset to Off state simultaneously.

Another object of the present invention is to provide action-information circuitry and associated single momentarily depressable switch means wherein a displayed message may be sent optionally to one or a plurality of users for their action and/or information and which circuitry may comprise fail-safe means and arrangement wherein sending of a false or undesired information message or sending to an undesired or to a false addressee is prevented to an optimum degree.

Another object of the present invention is to provide a display responsive message system adapted for command and control computer and communication system operations whereby messages may be sent at will to anyone or any plurality of a great number of subscribers via the computer system network and wherein the computer network may optionally process the information between receiving it and sending it.

While the novel and distinctive features of the invention are particularly pointed out in the appended claims, a more expository treatment of the invention, in principle and in detail, together with additional objects and advantages enumerated or apparent therefrom is afforded by the following description taken in conjunction with the accompanying drawings in which:

Figure 3:
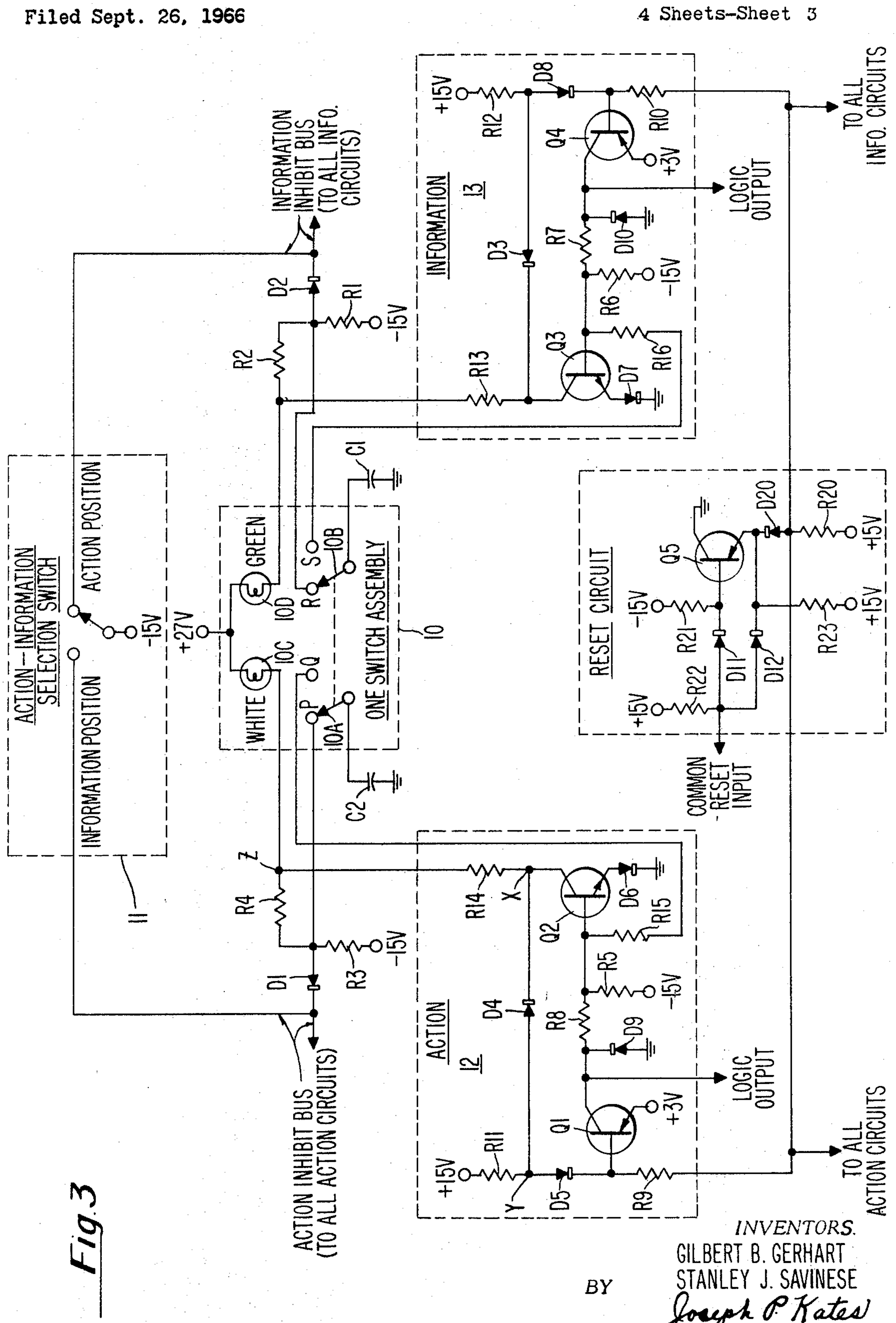
Figure 4:
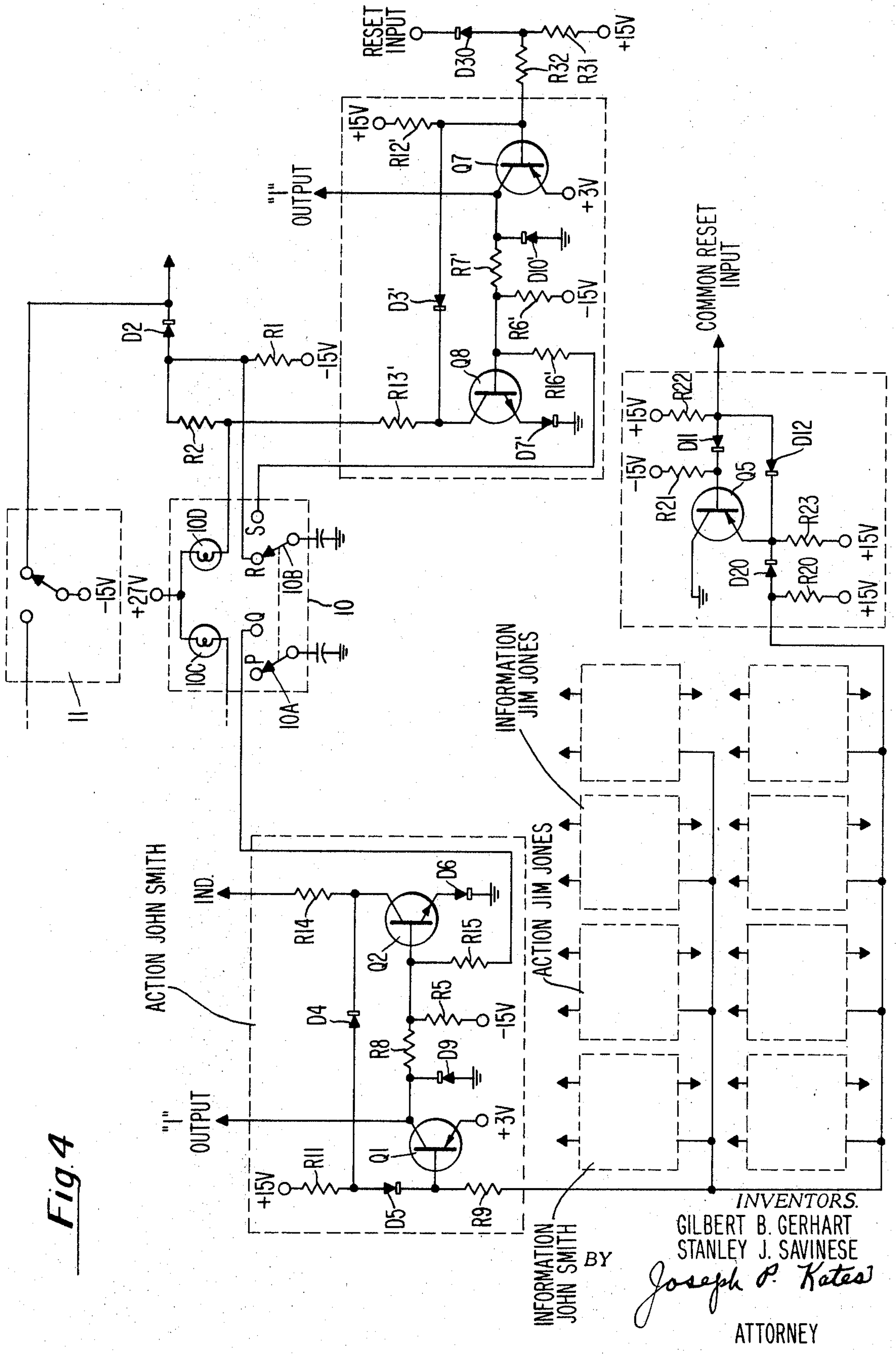

FIG. 3 is a schematic diagram of a single action-information circuit of the preferred embodiment of the invention illustrating an action flip-flop circuit, an information flip-flop circuit, and their structural interconnection and illustrating the input actuating, indicator, information inhibit, sampling and reset circuit means; and FIG. 4 is a partially schematic and partially block representation of printed circuit board of the preferred embodiment of the invention wherein ten of the flip-flop circuits are incorporated together with one of the common reset input means and one of the individual reset means of the preferred embodiment of the invention.

Figure 1:
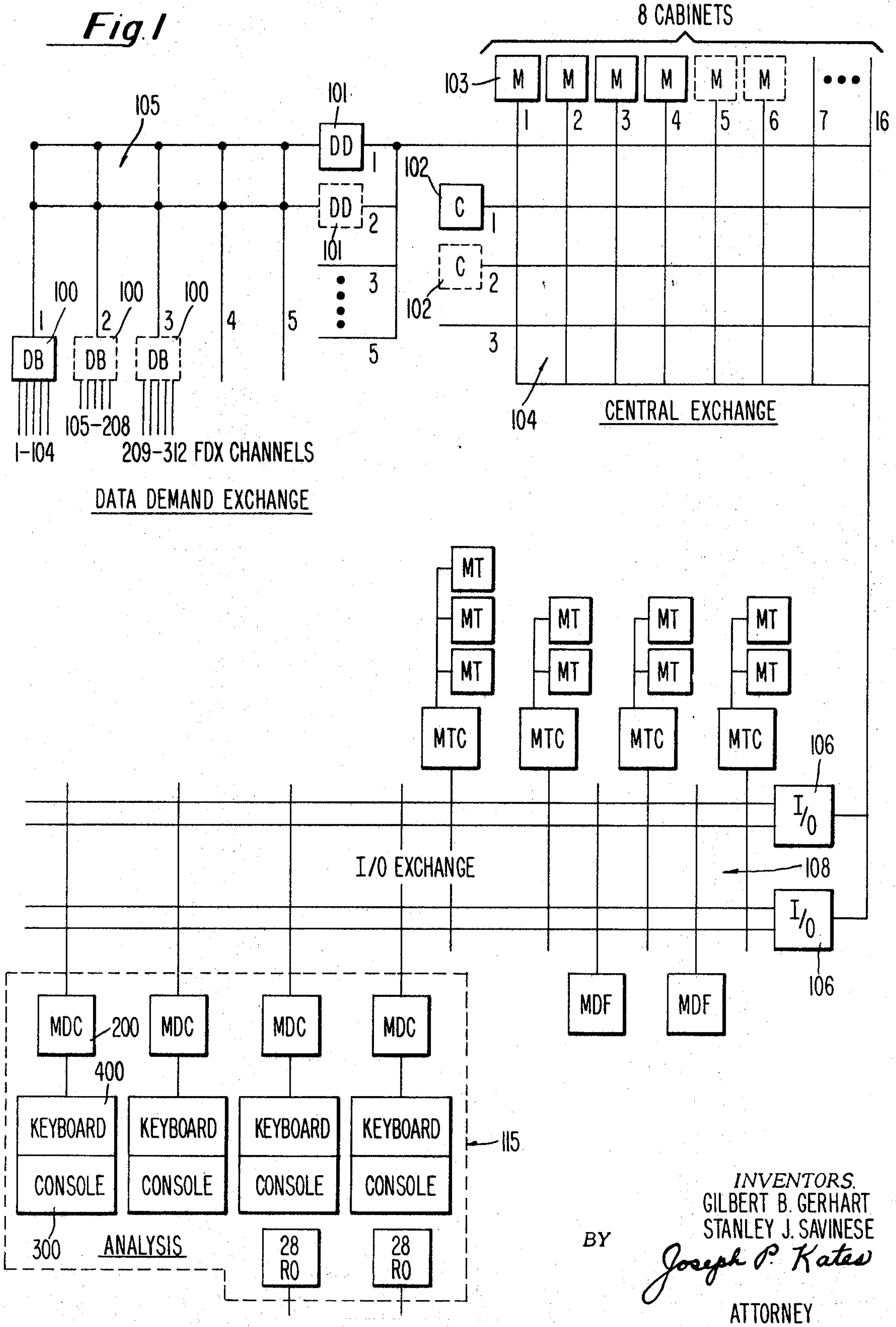
FIG. 1 is a block diagram of a first preferred embodiment of an automatic message processing system incorporating the present invention and in which an analysis unit comprising a controller, a message display console and a keyboard console are connected as portions of an input/output unit.

Now refer to the drawings and in particular to FIG. 1. The block diagram of FIG. 1 illustrates a typical modular computing and automatic message processing system which may be provided and in which the present invention may be incorporated, for example. In the FIG. 1 system may be provided a plurality of data buffer modules 100, a plurality of data demand modules 101, and a data demand exchange 105. Data buffer modules 100, data demand modules 101 and the data demand exchange 105 serve as an external communication system into the embodiment modular computer system by which communication may be established with a plurality of remote subscribers. There may also be provided a plurality of requestor modules comprising a plurality of computers or computer modules 102 and a plurality of input/output control modules 106. Also provided may be a switch interlock 104, and a plurality of individual memory modules 103. The requestor modules 102 and 106 may share memory modules 103 by means of switch interlock 104. An input/output (I/O) exchange 108 and a plurality of peripheral input and output and input/output units (some not shown and some not numbered) may be provided. The input/output control modules 106 may be connectible through input/output exchange 108 to the plurality of peripheral input/output units. It will be understood that other input and output and input/output units (not shown) are connectible to the terminals, shown unused in FIG. 1, of the I/O exchange 108. Those shown comprise magnetic tape controllers MTC (not numbered) and magnetic tape files MT (not numbered). Additional input/output analysis units 115 which may comprise a display controller 200, a display keyboard 400 and a display console 300 may be provided and may comprise the flip-flop, switching, indicator, sampling and reset means of the present invention.

Provided in the analysis input/output unit 115 may, for example, be a plurality of additional message display keyboard, display console adn controller mechanisms (not numbered). It will be understood that the preferred embodiment system optionally may have numbers of input/output control modules, input/output units, memory modules and computer modules other than that illustrated and various configurations of the data demand exchange mechanism, and present or contemplated modifications of the automatic message processing system of FIG. 1 may be provided and may incorporate the invention. The system of FIG. 1 is a computer system of the type sold by the Burroughs Corporation, the assignee of the present invention, and is known as the D–825 system. The particular configuration of FIG. 1, including the data demand exchange and communication subsystem is a configuration of the type of system known as the automatic message processing system, such as is described in patent application, Ser. No. 313,591 of John T. Lynch and Fred G. Wolff entitled "A Store and Forward Message Switching System Utilizing Modular Data Processor" filed Oct. 3, 1963, now U.S. Pat. No. 3,302,182, issued on Jan. 31, 1967, and assigned to the assignee of the present invention. The operation of the FIG. 1 embodiment in receiving and sending communication, in processing and storing data and its other functions has been described in the above identified Lynch and Wolff application, in the published literature and these referred to applications and computer machines are incorporated by reference herein. However, description of the structure and operation of the entire system as exemplified in the FIG. 1 illustrative embodiment is given herein in desirable detail to facilitate clear understanding of the present invention.

Figure 2:
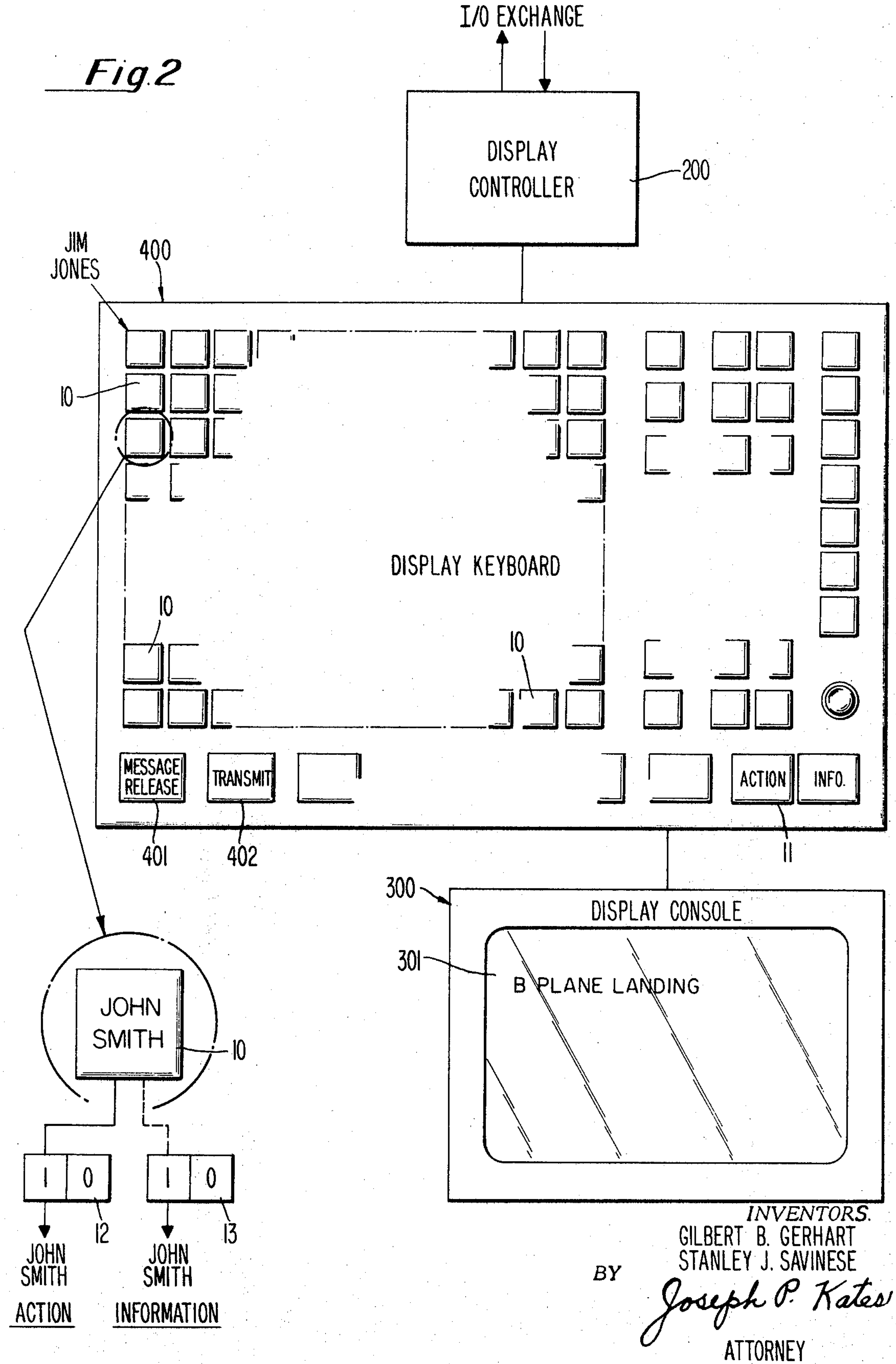
FIG. 2 is a partially pictorial, partially schematic and partially block representation of a portion of the display controller, message display console and the keyboard console circuitry of the input-output analysis unit of FIG. 1.

Refer to FIG. 2. FIG. 2 illustrates, partially in block and partially in schematic and pictorial form, units shown also in FIG. 1 and which may be provided comprising the display controller 200, the display keyboard 400 and the display console 300 including an illustrative visual display message of the input/output device of the system in which the invention may be employed. The display controller 200 is essentially a memory device which may contain a memory portion and additional circuitry. Display controller 200 serves as a buffer and contains the information which is displayed upon the display console 300. Display console 300 may comprise a cathode ray tube 301 in a cathode ray tube type of display which may be provided A suitable display keyboard and display console which might be utilized, for example, is that available from the assignee of the present invention, the Burroughs Corporation, Defense and Space Group, Paoli, Pa. and which is described in a brochure entitled "Display Systems From Burroughs" and available from the Burroughs Corporation, Defense and Space Group Marketing Division, Paoli, Pa. 19301 and designated 65–6–2–10M. This brochure and its displays are incorporated by reference in the present application.

Additional description of a system and of a display suitable for the message processing system of the preferred illustrative embodiment of FIGS. 1 and 2 is described in an article appearing on pages 78–84 of "Electronics Industries" of September 1964, entitled "Computer-Based Message Switching Centers" by Fred G. Wolff, one of the co-inventors of the above referenced and incorporated patent application. The illustrative message "B plane landing" illustrated on the face of the cathode ray tube portion 301 of display console 300 might be a portion of the complete information of a message stored in the display controller 200. An operator may determine the person or address to whom the message is to be sent and whether the message is for the addressee's action or for his information. In the display keyboard 400 the addressee, or addressees, to whom a message is to be sent are selected by momentarily depressing one or more of a number of buttons 10 which are provided and which may comprise combination illuminating devices and momentary push button contact type switches which are activated in a manner to be described. Each of the buttons may designate a particular addressee, for example, as shown, one of the buttons may designate John Smith and another button may designate Jim Jones. Provided in the display keyboard also is an action-information switching means 11. A message release switch 401 and a transmit switch 402 are also provided in the display keyboard 400 for fail-safe protection against transmission of false or unintended message communication. Depressing of a button 10, for example, the John Smith button, in accordance with the setting of the action-information switch 11, activates one or the other of a pair of flip-flops 12 and 13 as will be described. A separate pair of action-information flip-flops, such as flip-flops 12 and 13, may be connected electrically to be responsive to each of the addressee designating button switch means 10. When its "one" state is high, the flip-flop 12 indicates that the message which is displayed on display console 301 is to be sent to John Smith for action. When the one side of the flip-flop 13 is high, it indicates that the message which is displayed on cathode ray tube 301 of display console 300 is to be sent for information purposes to John Smith. It will be understood, of course, that the message information which is in display controller 200 and a portion of which is indicated on display console 300 may be initially loaded into the system via the data demand exchange channels shown in FIG. 1 and may be loaded also into memory or into other input and output devices, for example, drums or tapes as a program utilized with the computer system determines. The action-information switch 11 is always set to one or the other predetermined contact position. Depressing of an appropriate button 10 enables the computer system to send the message which is stored therein as the program dictates to the desired subscriber, for example, John Smith. Simultaneously, also the information as to whether the message is for action or for information may be sent to the subscriber by program actuation. It will be understood that without departing from the principles of the invention taught herein, many configurations of systems with which the FIG. 2 display controller, display keyboard and display console may be utilized other than that of FIG. 1 may be provided. Also as desired, the display keyboard 400 and display controller 200 and display console 300 may be made separate units, or may be constructed as portions housed in a single cabinet, and the invention is not to be limited in scope by virtue of the illustrative embodiment described and shown herein.

Upon depressing a push button switch 10 of display keyboard 400, with the switch 11 in action position, for example, the button may be illuminated with white light, and with the switch 11 in information position the button may be illuminated with green illumination.

Now refer to FIG. 3. The illustrative embodiment computer system logic circuit means operate generally at zero and three volt level potentials (0 v. and +3 v.) and power supply sources of positive 27 volts (+27 v.), positive 15 volts (+15 v.), negative 15 volts (−15 v.), and positive three volts (+3 v.) may be provided.

FIG. 3 illustrates two of the flip-flops of the push button circuit of display keyboard 400 (see FIG. 2), that of the action flip-flop circuit 12 and that of the information flip-flop circuit 13. Action flip-flop circuit 12 comprises transistors Q1 and Q2 and their circuits which may be provided. Information flip-flop circuit 13 comprises transistors Q3 and Q4 and their circuits which may be provided. There may be provided as many action flip-flops 12 and as many information flip-flops 13 as there are switch buttons 10 and for each of the buttons, a circuit, such as that shown in FIG. 3 (but which optionally may or may not be connected to the same one of the reset circuits as will be brought out hereinafter in describing FIG. 4), may be provided and may correspond to a particular addressee. The button 10 may comprise a switch assembly also denoted by the numeral 10. The action-information selection switch 11 is illustrated by way of example in FIG. 3 as being thrown to its action position. As will be described, in its action position switch 11 causes all information flip-flops to be inhibited from being switched to the On state. Similarly, in its information position switch 11 causes all action flip-flops to be inhibited from being switched to the On state. Switch 11 may be connected to the −15 volt (negative fifteen volt) power supply source. The switch assembly 10 may comprise a double pole, double throw switch comprising two position switch contact means 10A and two position switch contact means 10B. Both contacts are mechanically linked or ganged so that when button 10 for their particular action-information circuit is not depressed both contacts engage the terminals, contact 10A engaging terminal P and contact 10B engaging terminal R, as shown in FIG. 3 and when the particular button 10 is depressed both contacts engage the opposite terminal, contact 10A engaging terminal Q and contact 10B engaging terminal S. In the switch assembly 10 also may be provided a white illuminating lamp 10C and a green illuminating lamp 10D. A first voltage divider may be provided and may comprise a resistor R3, a resistor R4 and the white illumination lamp 10C. A second voltage divider may be provided and may comprise a resistor R1, a resistor R2 and the green illumination lamp 10D. Transistors Q1 and Q2 are complementary transistors, one being of the NPN and the other of the PNP type. For example, in the illustrative embodiment, transistor Q1 is a PNP transistor and has a base, an emitter and a collector. The emitter of transistor Q1 is electrically connected to the positive 3 volt (+3 v.) source. Connected between the base of transistor Q1 and the positive fifteen volt (+15 v.) supply source there may be provided a diode D5 and a resistor R11. The cathode of diode D5 is connected to the transistor Q1 base and the diode D5 anode is connected to resistor R11. At its end opposite the diode connected end resistor R11 is connected to the +15 v. source. Similarly transistor Q2 has a collector, a base and an emitter. A diode D6 may be provided and may have its anode electrically connected to the emitter of transistor Q2. The cathode of diode D6 is electrically connected to ground. Diode D6 provides protection against reverse voltage in excess being applied across the emitter to base junction of the transistor Q2. A current limiting resistor R8 is provided and is connected at one end to the collector of transistor Q1 and is connected at its other end to the base of transistor Q2. The output of transistor Q1 is thereby directly coupled to the input to transistor Q2 through resistor R8. A resistor R5 is provided and electrically connects the −15 volt power supply source to the base of transistor Q2 at the junction between resistor R8 and the base of transistor Q2. A current limiting resistor R15 is provided and connects the base of transistor Q2 to the normally open and unconnected (undepressed) contact position Q of the push button switch contact 10A. When the switch 10 is depressed momentarily, connection of this contact 10A and the base of transistor Q2 will take place. Following depression (as by spring return means not shown) the switch is immediately released to its normally closed opposite terminal P connected condition. A diode D4 is provided. The cathode of diode D4 is connected to the collector of transistor Q2 and its anode is connected to the junction between resistor R11 and the anode of diode D5. An action inhibit bus is provided between the information terminal of the action-information selection switch 11 and all of the action flip-flop circuits by means to be described. Similarly, an information inhibit bus is provided between the action terminal of switch 11 and all of the information flip-flops by means to be described. Between the action inhibit bus and the junction between resistors R3 and R4 of the voltage divider network of the white illumination lamp 10C circuit may be provided a diode D1. The cathode of diode D1 is connected to the action inhibit bus and the anode of diode D1 is connected to the junction between the two resistors R3 and R4. A capacitor C2 is provided. One plate of capacitor C2 may be grounded. The junction common to the resistors R3 and R4 and the anode of diode D1 is connected to the terminal P, the normally closed terminal position of switch contact 10A. When contact 10A is in its normally closed position, diode D1 is connected via the terminal P and contact 10A to the ungrounded plate of the capacitor C2. As will be explained hereinafter the voltage on the ungrounded plate of capacitor C2 is critical during the operation of the circuit. A resistor R14 is provided. Resistor R14 is connected on one end at the junction between the white illumination lamp means 10C and the resistor R4. On its other end, resistor R14 is electrically connected to the collector of transistor Q2. Resistor R14 is the transistor Q2 collector resistor and it develops the voltage at the collector of transistor Q2. Resistor R14 also provides sufficient resistance in the circuit to prevent overload at times when the white illumination light 10C is cold. Resistor R14 is also employed to provide enough loop gain to insure switching of the transistors Q1 and Q2 to the On state when in activated condition. A logic output connection lead (not numbered) is provided to the collector of transistor Q1 for use in a scanning operation of all the transistor flip-flop circuits to sample and determine which ones, if any, are in the On state at any particular time. A diode D9 may be provided, having a cathode and an anode. The cathode of diode D9 is connected to the collector of transistor Q1 and the anode of diode D9 is grounded to provide the needed ground connection to insure that the logic output circuit will see either a zero (0) or a positive three (+3) volt level at the collector of transistor Q1 when scanning is performed.

The transistor Q3 and Q4 circuit shown in the right hand portion of FIG. 3 is substantially similar to the action flip-flop circuit shown at the left hand side except that it comprises the illustrative information flip-flop circuit. A capacitor C1, equivalent in function to capacitor C2 previously mentioned, is provided and connected via the normally closed contact 10B of switch assembly 10 at terminal R (as illustrated) to the junction between two resistors of a voltage divider. This voltage divider comprises a resistor R1, a resistor R2 and the green illumination lamp 10D of switch assembly 10, the three elements being connected in series. One side of both the white illumination lamp or light 10C and green illumination lamp or light 10D is connected to the positive 27 volt (+27 v.) power supply source. The other side of the white lamp 10C is connected to the end of resistor R4 opposite its resistor R3 connected end and the other side of the green illumination lamp 10D is connected to the end of resistor R2 opposite its end connected to resistor R1. The illustrative contacts 10A and 10B may each comprise wiper arms, for example, which at the unfixed end is positionable at one (terminals P and R) or the other (terminals Q and S) of the normal and of a momentary closed position. The wiper arm of contact 10B in the normally closed position and the plate of capacitor C1, connected to the wiper arm, is connected via terminal R to the junction between the voltage divider resistors R1 and R2. Also connected between the junction of resistors R1 and R2 and the information inhibit bus which leads to all information circuits may be a diode D2. The anode of diode D2 is connected at the junction between the two resistors R1 and R2 and its cathode is connected to the information inhibit bus. The action inhibit bus is connected to the cathode of diode D1 and to an information position terminal of an action-information contact switch 11 which is provided. An action position terminal of switch 11 is also provided and the information inhibit bus is connected between this terminal and the cathode of diode D2. The action-information switch also may have a wiper arm or equivalent by which the switch 11 is always either in the action or the information switch position. The fixedly secured arm side of the contact of the action-information switch 11 is connected to the −15 volt supply.

The information flip-flop circuits of transistors Q3 and Q4 which are provided may be identical to the above described circuits of transistors Q1 and Q2. Transistor Q3 has a base, a collector and an emitter. The emitter is connected to the anode of a diode D7. The cathode of diode D7 is grounded. Diode D7 as in the case of diode D6 provides protection against reversal of the base emitter voltage (voltage across the base emitter diode) of transistor Q3. A current limiting collector resistor R13 is provided which may be similar to resistor R14 of the action circuit. Resistor R13 is connected between the collector of transistor Q3 and the junction between the resistor R2 and the green illumination lamp 10D. Resistor R13 (as resistor R14), also makes up for the low "Off" resistance of the green illumination lamp 10D. A transistor Q3 base resistor R16 is provided similarly to resistor R15 of the transistor Q1 and Q2 circuit. Resistor R16 is connected to the base of transistor Q3 at one end and at the other end is connected to the normally open terminal of the contact 10B of the actuation switch assembly 10. When contact 10B of switch 10 is in momentarily depressed position, the base of transistor Q3 is connected to the ungrounded side of capacitor C1. Thus, depressing switch 10 provides the On or the Off voltage required to change state of the circuit as hereinafter explained. Resistor R16 is also a current limiting resistor to protect the transistor Q3 against current overload. Transistor Q3 may be an NPN transistor. A second transistor Q4, which may be a PNP transistor, is also provided. Transistors Q3 and Q4 are complementary for a purpose to be described. Transistor Q4 also may have an emitter, a collector and a base. The transistor Q4 emitter is connected directly to the positive three volt source. Diodes D3 and D8 which are provided, and have their anodes connected, comprise a feedback path between the collector of transistor Q3 and the base of transistor Q4. The cathode of diode D8 is connected to the base of transistor Q4 and the cathode of diode D3 is connected to the collector of transistor Q3. Provided and connected between the junction of the anodes of the diodes D3 and D8 and the positive 15 volt supply is a resistor R12. Resistor R12 is provided to insure performance of the circuit despite the event of burnout of the green illumination lamp 10D. The action of information flip-flop circuit resistor R12 is very similar to that of resistor R11 of the action circuit. Between the base of transistor Q3 and the −15 volt supply source is provided a collector resistor R6 of PNP transistor Q4. A coupling resistor R7 (similar to resistor R8) is provided between the base of transistor Q3 and the collector of transistor Q4 to provide direct coupling between the two transistors. At the junction between the collector of transistor Q4 and one end of resistor R7 is provided a diode D10. Diode D10 may have its anode grounded. Diode D10, as in the case of diode D9 of the transistor Q1 and Q2 circuit, also provides the required ground level for a logic output sampling of the transistor information circuits comprising circuits similar or identical to transistors Q3 and Q4 to determine whether they are in the On position in a scanning operation to be explained. The logic output voltage is supplied to the collector of transistor Q4 via a terminal (unnumbered) which is provided.

A reset circuit to reset and turn off all of the action-information circuits of a controller, console and keyboard analysis combination as shown in FIG. 1 is provided. The reset circuit may comprise a transistor Q5 and associated circuitry. Transistor Q5 has a grounded collector, a base and an emitter. A base resistor R21 may be provided. The base is connected to the −15 volt power supply source via resistor R21. The transistor Q5 may be a PNP transistor. A diode D20 and an emitter load resistor R20 may be provided. The emitter of transistor Q5 is connected to the cathode of diode D20. The anode of diode D20 is connected to one side of resistor R20. The other side of resistor R20 is connected to the positive 15 volt supply which is provided. The purpose of the diode D20 is that upon actuation of the reset circuit via the common reset input which will be described, the negative ground level or zero volts and the positive output, which otherwise normally in the illustrative embodiment is about 3 volts will be converted instead to a 0.8 to about 3.8 volt difference at the junction between resistor R20 and the anode of diode D20, Resistor R20 is provided to insure the On state of diode D20. The lower limit of 0.8 volt insures that there is always current flow through the diode D20 and the resistor R20 and therefore always at least some voltage between the junction between these two elements to be applied to the information and action circuits. This insures that a voltage greater than the +3 volts which is normally at the base of the system transistors will be applied to definitely switch the circuits Off. The collector of transistor Q5 is grounded. The base of transistor Q5 is electrically connected to the −15 volt power supply source via base resistor R21 to provide proper bias to the transistor Q5 base. The transistor Q5 circuit is a buffer circuit of the type found in computer systems such as the above-described system of the Burroughs Corporation and described in patent application Serial No. 246,855 of Anderson et al., filed Nov. 30, 1962, now U.S. Pat. No. 3,419,249, issued on Dec. 31, 1968, and assigned to the assignee of the present invention and incorporated by reference in this application.

A diode D11 is provided. The common reset input from the equipment which is normally at 0 volts but when reset is desired, is at the +3 volt level of the computer system equipment is applied to the base of transistor Q5 via diode D11. A diode D12 is also provided and is connected between the emitter of transistor Q5 and the anode of diode D11. The anodes of the two diodes D11 and D12 are electrically connected to each other. The cathode of diode D12 is electrically connected to the emitter of transistor Q5. The cathode of diode D11 is electrically connected to the base of transistor Q5. A resistor R22 is provided and at one end is connected to the junction between the anodes of diodes D11 and D12. At its opposite end resistor R22 is connected to the +15 volt power supply source. Resistor R22 is provided to insure compatibility with the computer system logic with which the circuit is employed in the preferred embodiment. The diode D11 provides level shift to compensate for the transistor Q5 base to emitter level shift upon operation of the reset circuit. Diode D12 is provided to speed up the response of the entire reset transistor circuit effectively such that proper wave-forms occur and so that a positive transition occurs abruptly at the junction between resistor R20 and the anode of diode D20 so as to insure rapid switching Off or reset of the circuits of the system.

CIRCUIT OPERATION

Referring again to FIG. 3, the operation of the circuit to provide the required setting, resetting and sampling of the action and information flip-flops and of the indication lamp circuits are now described.

Assume that both the action and information circuits are in "Off" condition. Assume also, for example, that the circuit of FIG. 3 is the John Smith button circuit shown in FIGS. 2 and 4. Assume further that it is desired to contact John Smith for action on the message which is currently on the display console 301. For this operation condition, the switch contact arm, or wiper arm, of action-information selection switch 11 (see FIGS. 2 and 3) is set to the position shown in the drawing. In this action position, as illustrated, the −15 volts power supply source is connected via the switch contact arm of action-information position switch 11 to the action position terminal. If action is required of John Smith on the displayed message and the switch 11 is connected to the information terminal, then the switch arm of switch 11 is thrown to its position engaging the action position terminal. In the reset or Off condition in which the action circuit is assumed to be, transistors Q1 and Q2 are in "Off" condition. In this condition, there is a minimum of current flow and, therefore, a minimum of power drain in the transistor Q1 and Q2 circuit, and also in the transistor Q3 and Q4 circuit. Assume that reset is not currently being applied. In this condition the reset input will be zero (0) volts. With zero volt reset input the junction between the resistor R20 and the anode of diode D20 is at about 0.8 volt potential. Transistor Q1 is kept in "Off" condition, by the voltage divider comprising resistor R11, diode D5, and resistor R9, the 0.8 volt applied by the reset circuit output from the junction of diode D20 and resistor R20 via the resistor R9 and the +15 volts from the supply source applied to the base of transistor Q1, via resistor R11 and diode D5. With minimum current flow across transistor Q1, diode D9 is fully conducting. Considering the current as electron flow, the electron current is flowing in the path from the negative fifteen (−15) volt source through resistor R5, resistor R8 and from the cathode to the anode of diode D9 to ground. This current flow establishes a negative potential of about minus three quarters of a volt (−¾ volt) at the base of transistor Q2. This −¾ volt potential essentially cuts transistor Q2 off or at least maintains transistor Q2 in minimum current flow condition. In this condition essentially only $i_{co}$ current flows through transistor Q2. With this negligible current flow, the voltage at the collector of transistor Q2 is very close to the +27 volts from the 27 volts supply source to which the transistor Q2 collector is connected by the white illumination switch contact 10C and the resistor R14. There is minimum drop across this resistor R14 circuit because of low transistor Q2 current flow. Diode D6 provides the feature of enabling a relatively cheap transistor to be utilized even though excessive negative voltage is applied at the base in the transitory condition of transistor Q2. As an alternative embodiment, this protection may also be afforded if a diode were connected with its cathode at the base of transistor Q2 and its anode grounded and the emitter instead was grounded. With the approximately +27 volts on the collector of stage Q2, the anode voltage of diode D4 is lower than its cathode and there is no current flow across diode D4. Because of this, a stable Off condition, or state, results wherein transistors Q1 and Q2 are kept in an Off or in low current flow state. In this condition junction point Z at the junction between the resistor R4 and the lamp 10C, is at approximately +27 volts. With point Z at 27 volts, the voltage divider comprising the resistors R3 and R4 establishes a voltage at the junction of R3 and R4 to which switch contact 10A is normally connected of approximately +7½ volts. In this condition, therefore, the capacitor C2 is charged to +7.5 volts, and since the bottom plate of capacitor C2 is grounded the top plate of the capacitor C2, that is the capacitor plate nearest the switch contact 10A of switch assembly 10 is at +7.5 volts. Assume that John Smith is to be called for an action message to be transmitted to him. Then with the information switch 11 turned to the action position, the John Smith button 10, shown in FIG. 2, is momentarily depressed. Depressing this button, or switch 10, closes the contacts 10A and 10B shown in FIG. 3 where they engage terminals Q and S respectively. That is contact is made to the terminal positions opposite these switch 10 positions illustrated in FIG. 3. Under these conditions the approximately +7.5 volts which is at the upper plate of capacitor C2 is transmitted via the terminal Q and via the resistor R15 to apply a relatively high positive voltage at the base of transistor Q2. At the instant of contact, this voltage will be +7.5 volts, which abruptly and rapidly switches transistor Q2, which is an NPN transistor, to highly conductive (saturated) condition. The heavy current flow through transistor Q2 flows through the resistance path of resistor R14 and the white illumination lamp 10C. This current flow both causes the switch 10 to light the white illumination lamp and causes considerable lowering of the voltage at the collector of transistor Q2 from the normal approximately +27 volts down to a voltage below the approximately +8 volts which appears at the junction between the anode of diode D5 and the resistor R11. When the voltage at point X becomes lower than the voltage at point Y, that is the diode D4 cathode potential is lower than its anode potential, conduction occurs across diode D4 and through resistor R11. The voltage at point Y immediately follows the lowering of the voltage at point X and causes the base of transistor Q1 to go negative and to drop well below the +3 volt level at which the base of transistor Q1 is normally maintained.

The change in potential across the input diode comprising the emitter and base of PNP transistor Q1 in this direction causes heavy current flow (saturation current) through transistor Q1. The heavily increasing current flow through transistor Q2 eventually the voltage at the point designated X to be about ground voltage. Because of the very low voltage drop caused by the low resistance of the diode D4, the circuit at the point designated Y will be only slightly above ground voltage. The base-emitter drop across transistor Q1 causes its base voltage to be at about +2.5 volts because of the clamping action of the base-emitter diode, the emitter being connected to the positive 3 volt source. Thus, the base of transistor Q1 is positive by 2½ volts approximately with respect to point Y. Under these conditions diode D5 is turned off since point Y (and hence the anode of diode D5) is at a potential below the base voltage of transistor Q1 (and hence below the cathode potential of diode D5). Thus, the diode D4 which was originally non-conducting is now conducting very heavily and diode D5, which in Off condition, is conducting very heavily, is now rendered non-conductive. The increased heavy collector current at transistor Q1 is coupled to the base of transistor Q2 via the resistor R8 keeping the transistor Q2 On. After the circuit transistor Q2 is turned on by the +7.5 volts at the upper plate of capacitor C2, the depressing of the button 10 being only momentary, the release causes the contact 10A to shift back to the normal closed position illustrated in FIG. 3. In the switch contact 10A position illustrated, the contact is disconnected from capacitor C2 and the +7.5 volts is no longer applied at the base of transistor Q2. However, the heavy current flow across resistor R8 keeps a positive voltage at the base of transistor Q2 causing its On condition to be maintained despite the disconnection of the base resistor R15 and the transistor Q2 base from the capacitor C2 by the releasing of the button 10 and the consequent disconnecting from momentary depressed position of corresponding contact 10A. Now the circuit of transistors Q1 and Q2 is in the second stable state, the On state, with both transistors Q1 and Q2 conducting heavily. This condition will continue indefinitely in the absence of an inhibiting action. The heavy collector current flow through transistor Q2 keeps the white illumination lamp 10C constantly lit, thereby informing that action transmission of the message may take place.

As mentioned, the continued heavy current flow through transistor Q2 eventually establishes the voltage at its collector (at point X) at approximately ground level. In this condition the current flow across resistor R14 which may have a resistance of 100 ohms, and the heavy current flow through the illumination lamp 10C which now has a resistance of the order of 700 ohms, causes the point labeled Z in the circuit to be at approximately +3 volts. The voltage divider action of resistors R3 and R4 causes the junction between these two resistors to be at approximately −4 or −5 volts. With the switch contact 10A in the terminal P connected position illustrated in the drawings, i.e., with the button released, the −4 or −5 volts is applied to the top plate of capacitor C2 to which the junction of resistors R3 and R4 is connected and capacitor C2 becomes charged in the On condition of the transistor Q1 and Q2 action flip-flop to the −4 or −5 volts potential at the junction between resistors R3 and R4.

An important feature of the invention is thus apparent that ability to modify or cancel at will the addressees selected and/or whether the message is for action or information is afforded at any time up to actual sending. For example, if the operator at the input/out analysis console realizes that he does not actually wish addressee John Smith, but wishes someone else, or if the operator wishes to cancel, or substitute a modified message in the interval between original decision and actual transmission, he may momentarily depress the, for example, "John Smith" button 10. Upon depressing John Smith button 10, the switch contact means 10A switches to the opposite terminal position from that shown in the drawing (to terminal Q), and the −4 or −5 volts at the capacitor C2 is then applied to the base of transistor Q2 turning transistor Q2 off. For this operation the diode D6 provides an important safety protection to enable an economical transistor Q2 to be employed, i.e., an economical commercial transistor utilizable for the purposes of transistor Q2 will not normally withstand a 4 volt reversely biased difference between its base and emitter without breaking down. For this reason, the circuit of diode D6 or the alternative circuit connected to the base of the diode to ground, which was mentioned hereinabove, comes into play to protect the transistor. That is, the reverse biasing of the base-emitter junction of transistor Q2, with the diode D6 cathode being grounded will essentially prevent any current flow across in the reverse direction across the diode D6. Diode D6 has a reverse breakdown point of about 20 volts. For this reason, no current flow will occur between the base and emitter of the transistor Q2 in the reverse direction, and hence the transistor will not break down. The alternative configuration wherein the diode cathode may be connected to the base of transistor Q2 and the anode would be grounded would effectively clamp the base to ground and would also prevent a sudden negative voltage of the −4 or −5 volt magnitude from the capacitor C2 from effecting reverse destructive current flow in the transistor Q2.

The application of the approximately negative 4 volts at the base of transistor Q2 rapidly turns off the transistor Q2. This causes the collector voltage of transistor Q2 to rise abruptly in the positive direction since it is connected to the +27 volt supply via the resistor R14 and the white illumination lamp 10C. The rise in voltage at the collector of transistor Q2 causes a rapid decrease in current flow across the diode D4 and when the voltage at point X has risen to above +2.5 volts, conduction across diode D4 ceases. That is, since the cathode of diode D5 and hence its anode without current flow through diode D5 is at approximately 2.5 volts, upon exceeding +2.5 volts at point X, the current flow action across the diodes D4 and D5 respectively, will reverse, i.e., diode D4 will cut off and diode D5 will start to conduct heavily. The heavy conduction across diode D5 causes the base of PNP transistor Q1 to go positive to about the 8 volt initial condition. This very swiftly cuts off transistor Q1. The cutting off of transistor Q1 is coupled via its collector and the resistor R8 to the base of transistor base Q2 as a negative going voltage change which causes transistor Q2 to continue to be cut off. This cut off of transistor Q2 continues despite the removal of the −4 or −5 volts from the plate of capacitor C2 by the restoring of contact 10A after the button has been pressed and released to the initial terminal position P illustrated in the drawings. It is apparent that the capacitor C2 both in the case of positive (+) or in the case of negative (−) charging leaks and discharges or charges very rapidly and even though the button 10 circuit removes the positive or negative voltage supplied by capacitor C2, the sustaining action of transistor Q1 and transistor Q2 maintains the transistor Q2 in the condition which the voltage then appearing at the capacitor initiates. That is, the momentary condition at the base of transistor Q2 resulting from the voltage momentarily applied from capacitor C2, whether in the cut off polarity and magnitude to cause Off state, or of the magnitude and polarity to cause On state, is maintained by the circuit of transistors Q1 and Q2 since there is direct coupling from the collector of transistor Q1 to the base of transistor Q2 whether or not a voltage is being momentarily applied at the base of transistor Q2.

An important feature of the invention is protection of the circuit against the effects of burning out of the white illumination lamp 10C. Similarly the circuit is protected in the event of burnout of the green illumination lamp 10D. Protection is provided against white lamp 10C burnout, for example, by the transistor circuit comprising the diodes D5 and D4 and the resistor R11. Assume that the transistor Q1 and Q2 circuit is in On condition, i.e., with transistors Q1 and Q2 both conducting heavily and the lamp 10C lit. Assume the lamp 10C burns out and an open occurs which removes the +27 volt supply and there is an open circuit between the 27 volt supply and point Z. Should the lamp or bulb 10C burn out, although the current path from the collector of transistor Q2 through resistor R14 and the lamp 10C to the +27 volt supply is open, a large amount of current flow may still be maintained from the collector of transistor Q2 across the diode D4 and through resistor R11 to the +15 volt supply source. Throughout this description, including the above statement, the current flow described is electron current flow or current flow from a point of relatively negative potential to a point of relatively positive potential. Obviously positive current flow would be described in the opposite direction. The removal of the +27 volt supply changes the current flow through transistor Q2 from about 40 milliamps to about 6 or 7 milliamps in the path across diode D4. The term "milliamps" is used herein as an abbreviation of milliamperes.

This current flow which continues across the diode D4 and though the resistor R11 is sufficient to cause point Y at the junction of the anodes of diodes D4 and D5 to be maintained at approximately one volt or one and one-half volts. Therefore, diode D5 is maintained non-conducting, and hence the base of transistor Q1 is held at about positive two and one-half volts (2½ v.) which enables heavy conduction to continue through the transistor Q1. This heavy conduction causes a positive going voltage at the base of transistor Q2 which maintains its heavy conduction. There thereby is provided a continuous On condition of the action flip-flop circuit even though the white illumination bulb 10C burns out so that loss of a message will not occur even though the indication panel does not indicate the On condition to the operator. Therefore, even though visual observation because of burn out of a bulb 10 is lost, when the logic output scan is applied to the collector of transistor Q1 in the operation of scanning the flip-flop circuits of all of the switches, the message which is actually intended to be transmitted to Smith is not lost. This condition occurs only if the lamp 10C burns out after the transistor Q1 and Q2 flip-flop circuit has been turned on. Should the transistor Q1 and Q2 action circuit be Off when the lamp 10C opens, the voltage divider circuit comprising resistors R3 and R4 and the lamp 10C connected to the +27 volt supply at the lamp side and connected to the −15 volt supply at the end of resistor R3 opposite its resistor R4 connected end is effectively removed and instead a negative 15 volts is applied directly to the upper plate of the capacitor C2. Then, even if subsequent depression of the switch assembly 10 is made such that the contact 10A shifts to the terminal Q, a negative voltage is applied to transistor Q2 which maintains transistor Q2 in Off condition and the circuit remains in Off condition despite pressing of the button 10. This protects against accidental undesired rendering of the circuit in On condition as by the operator unintentionally brushing across the button 10 in which the white illumination switch 10C has burned out. That is, with the lamp 10C burned out, no inadvertent setting and no false information therefrom is transmitted through the system.

This is a helpful feature in computer systems, for example, wherein it is particularly desirable to guard against transmission of false information through the system as by accidently brushing against the keyboard and not realizing the accident occurred when the illumination button, because of lamp failure, does not show this to the operator.

With the action-information switch 11 in the action position illustrated in FIG. 3, the information flip-flop circuit of transistors Q3 and Q4 is similarly cut off. This Off state of the transistor Q3 and Q4 circuit occurs because the −15 volt supply is applied via the action position terminal and the infirmation inhibit bust across the diode D2 and from terminal R via the normally closed contact 10B of switch assembly 10 to apply −15 volts, to the ungrounded plate of capacitor C1. Therefore, upon the actuation of the John Smith button, the contact 10B will switch to its terminal S position opposite its normally closed position engaging terminal R and the −15 volts which has been applied to capacitor C1 is applied via resistor R16 to the base of transistor Q3 to keep the information flip-flop circuit in Off state when the action-information switch 11 is in action terminal engaged position. The diode D2 shown of the information flip-flop circuit is thus an isolation circuit, the information inhibit bus line (not numbered) from the information terminal of switch 11 and the −15 volts source being applied to all of the information circuits in the system when the action-information selection switch is thrown to its action contact terminal.

Refer to the information circuit of transistors Q3 and Q4. The information circuit of transistors Q3 and Q4 is identical to that of the action circuit of transistors Q1 and Q2 and its operation is identical to that of the action circuit described above when switch 11 is thrown to the information terminal and the switch assembly 10 is depressed for an information copy of the message to be transmitted. Therefore, repetitious description of the operation of the transistors Q3 and Q4 information circuit is not given since it is substantially identical to the operation of the transistor Q1 and Q2 action circuit. However, to provide visible distinction to the operator, the lamp 10B is illuminated green when the appropriate button 10 corresponding to this circuit is depressed with the action-information switch 11 in information position. With the action-information selection switch 11 contact in the opposite position, i.e., the information position, the −15 volts is applied via the action inhibit bus and via the diode D1 and corresponding diodes in each of the action circuits through the contact 10A and corresponding contacts of the other action circuits to charge accordingly the capacitor C2 and corresponding action circuit capacitors. Upon depressing the appropriate button 10, the capacitor C2 applies minus fifteen volts (−15 v.) to the base of the action circuit of transistors Q1 and Q2 (and the corresponding action circuit transistors where other buttons 10 are depressed). That is, by depressing any button 10 in the action circuit, the action inhibit bus will turn the particular action circuit off if the switch 11 is in information position.

Refer to the showing of the reset circuit in FIG. 3. A reset circuit transistor Q5, which may be a PNP transistor, is provided and may have an emitter, a base, and a collector. Between the −15 volt power supply source and the base of transistor Q5 may be provided a base resistor R21. The transistor Q5 collector may be connected to reference ground. A common reset input terminal is provided. Between the common reset terminal and the junction between the base of transistor Q5 and resistor R21 may be provided a diode D11. The cathode of diode D11 is connected to the junction between the base of transistor Q5 and the resistor R21. The anode of diode D11 is connected to the common reset input. A diode D12 may also be provided. The cathode of diode D12 is connected to the emitter of transistor Q5 and its anode is connected to the anode of diode D11. Between the +15 volts power supply source and the junction of the anodes of diodes D11 and D12 with the common reset input, may be provided a resistor R22. Between the emitter of transistor Q5 and the +15 volt power supply source may be a resistor R23. Connected in parallel across resistor R23 may be provided a resistor R20 and in series with resistor R20 a diode D20. The cathode of diode D20 is connected to the emitter of transistor Q5 and its anode is connected to one side of resistor R20. The other end of resistor R20 is connected to the +15 volt power supply source. Between the base of transistor Q1 and the junction of the diode D20 anode and resistor R20 may be provided a resistor R9. Between the base of transistor Q2 and the junction of the diode D20 anode and resistor R2 may be provided a resistor R10. The junction of resistor R20 and the anode of diode D20 may also be connected to any desired combination of a plurality comprising at least one action circuit first flip-flop transistor base resistor such as resistor R9 and/or to a plurality comprising at least one information circuit first flip-flop transistor base resistor such as resistor R10 as will be explained in greater detail in the description of FIG. 4 hereinafter.

This junction between resistor R20 and the diode D20 anode is the point from where the reset circuit output is taken. In FIG. 3 the reset circuit output is shown applied to the action flip-flop transistor Q1 and Q2 circuit and other action circuits and the information flip-flop transistor Q4 and Q3 circuit and other information flip-flop circuits.

Reset may occur for a variety of causes, for example, when all the information on a display keyboard has been transmitted appropriately and it is desired to set up an entire new set of conditions on the display keyboard 400. When it is desired to reset all of the action and information circuits a common reset input pulse may be generated automatically in the logic of the display controller 200. This reset pulse is applied at the common reset input means at the junction between the resistor R22 and the anodes of diodes D11 and D12. The common reset input levels applied are at the conveniently obtainable levels of the illustrative embodiment computer system of zero (0) and three (3) volts. When a common reset input is received, a +3 volts level (long duration pulse) is applied to the base of transistor Q5 across the Diode D11. The term "level" in this instance is used with the meaning of a long duration 3 volt pulse input at the common reset input since the 3 volt pulse is required to be of long enough duration to enable resetting of all of the circuits on the keyboard. After this delay the voltage level will drop to zero (0). Transistor Q5 is an emitter follower and its emitter follows the voltage at its base closely and almost instantaneously. Hence the emitter immediately shifts from a 0 volt or reference ground voltage to the +3 volt change in level of the input pulse applied by the common reset input across diode D11 to the base of transistor Q5. Because of the parasitic capacitance of the lead between the anode of diode D20 and the flip-flop circuit first transistor base resistor or resistors as resistor R10, the action would normally slow up until this capacitance became charged. However, the diode D12 provides a very short charging path.

The action of the diode D20 which is connected to resistor R20 which is in turn connected to a +15 volt supply, raises the 3 volts to which the emitter of transistor Q5 has been brought up by the common reset input to about 3.8 volts. The 3.8 volts is applied through the base resistors of the flip-flop first transistors, for example, through resistor R10 to the base of transistor Q4. Thus, simultaneously via the other corresponding lead illustrated in FIG. 3 (not numbered) via resistor R9, the 3.8 volts is applied to the base of the transistor Q1. This 3.8 volt voltage is applied to the bases of corresponding action and information circuit PNP transistors to turn these transistors off. Turning of these PNP transistors off will turn off their complementary NPN transistors because of the direct coupling from the collectors of the respective PNP transistors to the base of the corresponding NPN transistors of each of the circuits to which this reset circuit is connected.

It should be understood that it is the provision of complementary transistors in each flip-flop circuit which is of importance in the operation, and not whether either of the transistors itself is NPN or PNP. It will be readily apparent to one skilled in the art that without departing from the herein disclosed principles of the invention the flip-flop circuits could readily be redesigned with the transistor Q1 and corresponding transistors as NPN transistors and with the transistor Q2 and corresponding transistors being PNP transistors.

Now refer to FIG. 4. In the illustrative embodiment printed boards or cards may be provided to contain some or all of the circuits. FIG. 4 illustrates a circuit board or card which may be provided and which comprises a plurality of the action flip-flop circuits, a plurality of the information flip-flop circuits, a common reset input circuit common to all but one of the flip-flop circuits on the card and a reset input circuit individual to one of the flip-flop circuits.

Thus, FIG. 4 illustrates a card where the connection from the common reset input is made to nine of the action and/or information flip-flop circuits and a separate reset input is applied to the tenth flip-flop circuit which also may be either an action or an information flip-flop circuit in accordance with the indicator to which it is connected. In the FIG. 4 illustrated card, ten flip-flop circuits are provided which may be action and/or information circuits in a distribution as determined by convenience. For example, the preferred illustrative embodiment may comprise 28 printed circuit boards or cards and not all of the action and information circuits on all of the 28 cards need be so employed. Also, any card need not have five pairs of action and information circuits to constitute the 10 circuits. Any action circuit may readily be paired with an information circuit on another card for design convenience and this may be effected frequently. The separate reset input circuit in the illustrated FIG. 4 example card is applied to an information circuit comprising transistors Q7 and Q8 which may be provided and is the circuit on this card which is provided with its own reset circuit. In lieu of the reset input from the junction between diode D20 and the resistor R20 applied into the base resistor R32 which is provided for the first flip-flop transistor Q7, a separate reset input lead and a diode D30 having its anode connected to resistor R32 opposite its transistor Q7 base connected end may be provided. The cathode of diode D30 is connected to the separate reset input means. Between the base resistor of transistor Q7 and the +15 volt power supply source is provided a resistor R31.

Instead of being applied from the junction between the resistor R20 and the anode of diode D20 of the reset circuit of FIG. 3, the reset input for the transistor Q7 and Q8 circuit is applied at the junction between resistors R31 and R32 via the diode D30. The diode D30 provides the same function as the diode D20 of the common reset circuit, that is, it raises the 3 volt input applied at the reset input from 3.0 volts to about 3.8 volts to insure cutting off of transistor Q7. The separate reset input provides flexibility to the logical designer. It will be understood that this feature could be modified readily to permit common reset input to all of the action circuits and/or all of the information circuits or in any combination of all or less than all and paired as desired or not paired where so desired. Optionally, separate reset means could be provided if the driving means of the equipment were adequate for such configuration or if additional separate driving means were provided. It will be understood also that the configuration of FIG. 4 represents only a single 10 action-information flip-flop circuit card. Where, for example, in the preferred embodiment 28 cards are provided, 280 action-information buttons may be provided.

The transistor Q7 and Q8 circuit of FIG. 4 is only one of two flip-flop circuits either the information circuit or the action circuit of such a pair. It should be understood that the action-information circuits need not be necessarily connected in pairs. For example, some subscribers, or addressees, may have information only or action only.

In the FIG. 4 illustrative card of 10 flip-flops any number may be action flip-flops and any number may be information flip-flops, but 9 of these flip-flops are reset by the common reset input and the 10th flip-flop is individually reset. There is no restriction on which action and information circuits are coupled together nor that they be on a single card. In fact, in one practical built illustrative embodiment system in most cases they were not thus joined. In the showing of FIG. 3, one case was arbitrarily selected wherein both action and information circuits happen to be on a single card, and, therefore, both are actuated by the same reset circuit. In general, only one of each pair may be actuated by the same common reset circuit.

Refer again to FIG. 2. Upon selecting a subscriber to receive the displayed message for his action or for his information, the action-information selection switch 11 is set accordingly by the operator. Then the operator may depress momentarily the button or buttons for whom the message for action or information is intended. That is customarily all addressees to whom a message is to be sent for action are taken care of by turning switch 11 to the action position and depressing the switch buttons 10 for all addressees from whom action is required. The action-information switch 11 may then be thrown to the information position. Then the switch buttons 10 of all addressees to whom the message should be sent for information purposes may be depressed with the switch 11 in information position. It will be understood, of course, that this does not restrict the operator. If then he wishes to have the message transmitted to additional persons for action, he may then turn the switch back to action and depress additional buttons, and if then he decides he wishes more people to be informed, he may again throw the action-information selection switch 11 to information and press additional buttons. This may be done at the option and as the thinking of the operator dictates. Optionally, and contemplated as within the scope of the invention, some buttons 10 may be utilized for additional comments by the operator. Up to sending of the message, the invention permits changes to be made readily if determined desirable by the operator. For example, assume that the operator has selected Jim Jones' button 10 for action and has depressed it bringing on the white light. Should he decide instead that Jim Jones is to receive information only, he may throw the action-information switch 11 to its information position and again depress the Jim Jones switch. This will cause the green lamp to become illuminated and the information circuit only to be connected. That is, this effectively resets the action flip-flop and sets the information flip-flop.

If, for example, John Smith has been selected for either action or information and the appropriate switch 11 and button 10 is set, but the operator changes his mind and decides he doesn't want John Smith to receive any copy, the action-information switch 11 is left in its position, i.e., either action or information, and the operator need only once again depress the John Smith button and the flip-flop which had been set will be reset. In that case, neither one of the action or information flip-flop circuits for John Smith is in set condition and the message of John Smith is eliminated.

When all the switches have been set up, checked and, if desired, corrected to the satisfaction of the operator, the illustrative embodiment of the equipment provides for a fail-safe operation in which two buttons must be pressed before transmission of the message occurs. To effect such committed action, the operator must first depress the message release button 401 which closes the switch (or otherwise enables) permitting message release. He must then press the transmit button 402 which closes the switch or otherwise enables the transmission of the message to all of the subscribers for whom the message was intended. Optionally, the apparatus may be made such that the pressing of the transmit button 402 does not transmit the message to subscribers but merely transmits the contents of the keyboard to the remainder of the system so that it can be operated upon or manipulated as the program dictates. Only when both the switch 401 and switch 402 are activated will the information which has been operated upon in accordance with the keyboard indication, the program and the information stored in memory be sent to all subscribers.

The description of the invention herein brings out that there is provided an action-information flip-flop circuit capable of producing an incandescent lamp indication and a logical voltage indication for computer systems and their input/output devices. The action-information will not effect bistable operation if the lamp burns out. This provides a protective feature which in conjunction with the feature that the logic level is not altered if the lamp fails prevents an erroneous logical indication if the operator is not aware of the failure of a lamp. The invention provides also that transistor failure will generally not give erroneous indications. The action-information circuit of the invention is adapted to operate upon control of a single push button wherein the button is pushed once to provide the light indication and the required, flip-flop condition, and is pushed again to extinguish the light and the flip-flop actuated condition. The action-information circuit of the invention sets up its own bistable conditions and the input switch carries out simply the commands of the operator. The action-information circuit of the invention further provides a novel flip-flop circuit wherein the circuit has the ability (1) to maintain two stable flip-flop states which can be electronically utilized; (2) also has the capability of driving two 40 milliampere current carrying lamps in parallel to give accurate visual as well as electronic information; and (3) has the capability to permit sampling of the electronic information even where the lamps are in open or burned out condition. In the invention taught herein there is provided a circuit and device capable of versatile performance and recoverable operation wherein designation of messages for action and for information and the addressees to receive them are readily changed, which circuit means are largely foolproof to permit accuracy from operator error, which device is adaptable to change of mind by the operator and of conditions and which instead of or in addition to transmission to addressees may provide optionally for transmission of the keyboard indications and addressees to the memory or may permit communication of the message to the operators themselves.

While not to be considered as limiting the scope of the present invention, in an illustrative embodiment the components of the circuit of FIGS. 3 and 4 may have the following values:

| Parts: | Designation or values |
|---|---|
| Transistors: | |
| Q1, Q4, Q7 and all corresponding PNP transistors of the action and information circuits | 2N404. |
| Q2, Q3, Q8 and all corresponding NPN transistors of the action and information flip-flop circuits | 2N3122. |
| Q5 | Motorola SM215. |
| Diodes: | |
| All diodes except diodes D20 and D30 | 1N4381 germanium diode |
| Diode D20 | Sylvania D65467. |
| Diode D30 | Sylvania D6467. |
| Capacitors: | |
| C1 | 0.1 $\mu$f. (microfarad) 50 v. |
| C2 | 0.1 $\mu$f. (microfarad) 50 v. |
| Resistors: | |
| R1 | 30,000 ohms $\pm$5% 1/4 w. |
| R2 | 24,000 ohms $\pm$5% 1/4 w. |
| R3 | 30,000 ohms $\pm$5% 1/4 w. |
| R4 | 24,000 ohms $\pm$5% 1/4 w. |
| R5 | 4,700 ohms $\pm$5% 1/4 w. |
| R6 | 4,700 ohms $\pm$5% 1/4 w. |
| R7 | 178 ohms $\pm$1% 1/4 w. |
| R8 | 178 ohms $\pm$1% 1/4 w. |
| R9 | 2,400 ohms $\pm$5% 1/4 w. |
| R10 | 2,400 ohms $\pm$5% 1/4 w. |
| R11 | 2,200 ohms $\pm$ 5% 1/4 w. |
| R12 | 2,200 ohms $\pm$ 5% 1/4 w. |
| R13 | 100 ohms $\pm$5% 1/4 w. |
| R14 | 100 ohms $\pm$5% 1/4 w. |
| R15 | 150 ohms $\pm$5% 1/4 w. |
| R16 | 150 ohms $\pm$5% 1/4 w. |
| R20 | 15,000 ohms $\pm$5% 1/4 w. |
| R21 | 4,300 ohms $\pm$5% 1/4 w. |
| R22 | 3,600 ohms $\pm$5% 1/4 w. |
| R23 | 6,800 ohms $\pm$5% 1/4 w. |
| R31 | 15,000 ohms $\pm$5% 1/4 w. |
| R32 | 2,400 ohms $\pm$5% 1/4 w. |
| Lamps: | |
| 10D | G.E. Type 327 or 387. |
| 10C | G.E. Type 327 or 387. |

While a specific embodiment of the invention has been shown and described, it should be recognized that the invention should not be limited thereto. For example, the complementary transistors of the flip-flops and the circuitry may readily be reversed so that the first stage (e.g., Q1 of FIG. 3) would be of the NPN type and the second stages (e.g. Q2 of FIG. 3) would be of the PNP type and the circuit values accordingly modified. Other types of substantially unilateral current flow devices could be employed in complementary circuit configuration in accordance with the principles of the invention taught herein. Less or more flip-flop circuits than the number suggested by the illustrative embodiment may be utilized. Examlies of other modifications contemplated as within the scope of the invention are the provision of some push button and flip-flop circuits for addenda to messages which the operator might wish to include, and which might be so designated upon some of the switches on the keyboard console. Various different values of components may be made within the framework of the invention and various alternative configurations are possible. For example, in the second transistor stages of the flip-flops (i.e. the stage 2) and for corresponding stages of the active and information flip-flops diode D20 which is connected between the emitter and ground may instead be connected between the base of the circuit and ground. Obviously, many other modifications and variations may be made in the instrumentalities and circuit arrangement of the specific embodiments shown without departing from the spirit of the invention. It is accordingly intended in the appended claims to claim all such variations as fall within the true spirit of the invention.

What is claimed is:

1. A flip-flop circuit comprising:

a first unilateral current flow device operably associated with an attendant circuit;

a second unilateral current flow device operably associated with an attendant circuit to carry current complementary to said first current flow device;

means to bias both said first and second current flow devices in a first current state;

means to momentarily trigger one of said first and second current flow devices to a second current state;

means to couple the output of the triggered current flow device to the other current flow device to latch said other device into said second current condition;

said first and second current flow device circuits further comprising a feed-back circuit having oppositely poled diodes coupled between said triggered and said other current flow devices to maintain them in said second state independent of release of said momentary trigger means, and biased capacitance means responsive to succeeding operations of said momentary trigger means and to the state of said current flow devices for successively shifting said current flow devices between said second and said first current states.

2. The flip-flop circuit of claim 1, said capacitance means comprising:

a capacitor and switch contact means which are electrically connected;

a biased voltage divider network comprising a first and a second resistor;

means disconnectably connecting said switch contact means to the junction between said first and second resistors to apply the junction voltage to said capacitor;

means to connect said capacitor opposite its switch contact-connected end to a reference voltage point; and means to connect said switch contact means to one of said current flow devices to selectively turn it On or Off;

said unilateral current flow device circuit means comprising a bias treminal coupled to said diode feedback network to cause both devices to be selectively On or Off, with one latching the other in that state.

3. In the flip-flop circuit of claim 1, said first unilateral current flow device comprising a transistor;

said second unilateral current flow device comprising a transistor complementary to said first transistor;

each of said transistors comprising a base, an emitter and a collector;

means to couple said first transistor collector to the second transistor base-emitter circuit;

said feed-back circuit comprising first and second diodes;

said first and second diodes being coupled between said second transistor collector and said first transistor base-emitter circuit;

a first source of voltage coupled through a first resistor to the junction between said diode anodes;

means to provide alternately positive and negative voltages to said second transistor base to trigger it to heavy and light conduction states accordingly;

a second resistor coupling a second voltage source to said second transistor collector to develop a voltage signal upon heavy conduction of said second transistor; and a path of conduction comprising a second transistor base resistor and said first transistor, whereby current in said base resistor causes regenerative current in said second and first transistors.

4. The flip-flop circuit of claim 3 including, (a) means to sample the current of said flip-flop to determine if it is in the On condition;

(b) said second transistor collector circuit further comprising a lamp connected between said second resistor and said second voltage source to emit light in the presence of substantial conduction therethrough when said flip-flop is in the On condition, and (c) said first diode, said first resistor and said first voltage source further comprising a path of second transistor collector current additional to the path through said lamp and having circuit values to maintain the state of said flip-flop circuit indepedent of lamp failure causing the current path through the lamp to open.

5. The flip-flop circuit of claim 3 including:

(a) a third diode having an anode electrically connected to said second transistor emitter, and having a grounded cathode to protect said transistor against break-down due to reverse bias applied in operation between said second transistor base and emitter.

6. The flip-flop circuit of claim 3 including, (a) means to reset said flip-flop circuit;

(b) said reset means comprising a source of reset input signal of normal computer circuit voltage states;

(c) means responsive to said reset voltage input to shift the levels of said normal computer circuit voltage; and (d) means to couple said shifted voltages to the base of said first transistor to reset said first transistor to low current conditions, said low current conditions being coupled to said second transistor, and thence back to said first transistor to effect rapid resetting to Off condition of said flip-flop.

7. The flip-flop circuit of claim 6 wherein:

(a) said reset means further comprises a third transistor having a collector, an emitter and a base;

(b) third and fourth diodes each having an anode connected to said reset voltage input, said third diode having a cathode connected to said third transistor base, said fourth diode having a cathode connected to said third transistor emitter;

(c) a fifth diode having its cathode connected to the junction of the cathode of said fourth diode and said third transistor emitter and having an anode;

(d) a fourth resistor connected between said first power source and the anode of said fifth diode; and (e) said means to couple said shifted voltages further comprising means to apply output from the junction between said fourth resistor and said fifth diode anode to the base of said first transistor.

8. The flip-flop circuit of claim 1 including, (a) a source of positive and negative intermittent voltages;

(b) said means to momentarily trigger comprising switch contact means momentarily actuable to switch said positive and said negative source voltages to one of said unilateral current flow devices to successively bias it to said first and second current states.

9. The flip-flop circuit of claim 8 including,
(a) visible indication means electrically connected between said bias means and one of said current flow devices and means to prevent destruction of said visible means from effecting the On condition of said current state.

10. The flip-flop circuit of claim 1 wherein said means responsive to succeeding operations further comprises,
(a) a capacitor;
(b) means to alternatively charge said capacitor to positive and negative potentials of magnitude and polarity suitable to change the then present current state of said flip-flop, and
(c) means to effect momentary switching and connection between said capacitor and one of said devices to cause said one of said devices to change from its first or second current state to the opposite first or second current state.

11. The flip-flop of claim 1 and including:
(a) a second flip-flop circuit structurally similar to said first flip-flop circuit;
(b) selection switching means to enable one of said flip-flop circuits to be On and to inhibit the unselected flip-flop from being On;
(c) said selection switching means comprising
(1) a voltage storage device for each of said flip-flop circuits,
(2) a source of cut-off direction voltage,
(3) a first flip-flop inhibit bus and a second flip-flop inhibit bus,
(4) a switch contact to apply said last-named cut-off direction voltage selectively to one or the other of said inhibit buses, and
(5) a pair of diodes, each connected to one of said inhibit buses and to one of said flip-flop circuit storage devices to charge its respective storage device when in cut-off voltage switch connected position such that upon actuation of said momentary trigger means its said flip-flop circuit storage device is connected to one of the unilateral current flow storage devices to turn its respective flip-flop circuit Off, thereby maintaining said last-named flip-flop circuit Off as long as said switch contact is in position to apply its cut-off direction voltage to said storage means.

12. The apparatus of claim 11 wherein:
(a) said first flip-flop circuit is an action flip-flop circuit, said second flip-flop circuit is an information flip-flop circuit;
(b) said selection switch means switch contact comprises a single action-information switch contact and said cut-off direction voltage source;
(c) said apparatus including a plurality of said action and of said information flip-flop circuits connected to operate in pairs;
(d) each of said action flip-flop circuits and each of said information flip-flop circuits comprising one of said inhibit bus connected diodes and one of said storage means; and
(e) means to connect each inhibit bus diode to its corresponding action or information inhibit bus such that the action inhibit bus is connected to each of the action flip-flop circuits and the information inhibit bus is connected to each of the information flip-flop circuits to inhibit selectively all action or all information flip-flop circuits when said single action-information switch contact is in inhibit position for action or for information.

13. The apparatus of claim 12 including:
(a) a source of reset input;
(b) means to shift said reset input to an output voltage sufficient to insure cut-off of said flip-flop circuits when in On condition; and
(c) means to couple said reset means shifted output voltage selectively to a predetermined one or plurality of said action flip-flops and information flip-flops, regardless of pairings of said information and action flip-flops, such that selectively said flip-flops are structurally conveniently interconnected and reset.

14. A transistor circuit comprising:
(a) at least a first transistor;
(b) feedback and coupling circuit means to maintain said transistor in the current flow state to which it is triggered;
(c) a voltage divider network comprising a first impedance means having a first and a second impedance dividing point;
(d) a first source of voltage of a first magnitude and a second source of voltage of a second magnitude;
(e) means to connect said first source of voltage to one end of said first impedance means and means to connect said second source of voltage to the other end of said first impedance means;
(f) a voltage storing device and means to connect said voltage storing device at one end to a third source of reference voltage of magnitude between said first and second magnitude voltages;
(g) means to connect said voltage storage device selectively to a said first impedance dividing point or to said transistor;
(h) said transistor circuit further comprising means responsive when connected to said voltage storing device to the voltage then stored on said voltage storing device to accordingly enable triggering of said transistor to On and Off state and to maintain the state of said transistor regardless of removal of said storing device triggering voltage;
(i) a first transistor output current carrying path means comprising load second impedance means connected between said second impedance dividing point and said transistor to apply the current flow from said transistor to said second impedance point to cause storing of voltage on said voltage storing device when connected to said first impedance dividing point of magnitude according to the state of current flow of said transistor;
(j) said source voltages and impedances being of magnitudes such that successive actuation of said means to connect selectively said storing device to said first impedance dividing point or to said transistor effects reciprocatingly turning On and turning Off of said transistor.

15. The transistor circuit of claim 14 wherein:
(a) said transistor comprises a base and an emitter forming a first input diode;
(b) a second diode connected between said first input diode base and emitter in the direction such that heavy back bias applied during operation of said transistor does not destroy the transistor since the second diode withstands a larger reverse bias than the transistor to protect the transistor against breakdown current flow in the reverse direction upon application during operation of sufficient reverse voltage across the base-emitter input diode to have caused such reverse current in the absence of said second diode.

16. The transistor circuit of claim 15 wherein:
(a) said second diode comprises an anode and a cathode;
(b) means to ground said second diode cathode;
(c) means to connect the anode of said second diode to said emitter.

17. The transistor circuit of claim 14 including:
(a) a lamp to provide visual indication of the state of said transistor;
(b) means to connect said lamp between said second impedance dividing point and said second source of voltage;

(c) a second transistor output current carrying path means and means to connect said second current carrying path means in permanent connected relationship to said transistor;
(d) said second current path means and said lamp connection arrangement thereby serving to maintain the transistor circuit in its current state and to protect the circuit despite burnout of said lamp to open circuit;
(e) a logic output sampling means coupled to said transistor circuit to enable automatic sampling of the state of said transistor circuit regardless of the operative condition of said lamp for visual indication.

18. The transistor circuit of claim 14:
(a) said transistor circuit further comprising a second transistor complementary to said first transistor;
(b) said feedback and coupling circuit means further comprising means to couple the output of said first transistor to the input of said second transistor to maintain said second transistor in the same state of current flow as that of said first transistor;
(c) said feedback and coupling circuit still further comprising means to directly couple the output of said second transistor to the input of said first transistor and second transistor load first resistor means connected to said means to directly couple and to the output of said second transistor to provide an input voltage coupled from said second transistor to said first transistor to at least sustain said second transistor in the current carrying state of said first transistor.

19. The transistor circuit of claim 17 including:
(a) a second transistor, each of said transistors having a collector, a base and an emitter, said first transistor being an NPN transistor, said second transistor being a PNP transistor;
(b) said feedback and coupling circuit means further comprising a first and a second diode, means to connect the anodes of said first and second diodes together, means to connect the cathode of said first diode to the collector of said first transistor, and means to connect the cathode of second diode to the base of said second transistor;
(c) a third impedance means;
(d) a positive voltage fourth source;
(e) means to connect said third impedance means between said positive voltage fourth source and said connection between the anodes of said two diodes;
(f) said feedback and coupling circuit means further comprising a fourth impedance means and means to connect said fourth impedance means between the collector of said second transistor and the base of said first transistor to provide direct coupling therebetween;
(g) a fifth impedance means and means to connect said fifth impedance means at one end to the junction between said coupling fourth impedance means and the base of said first transistor;
(h) a negative voltage fifth source connected to the other end of said last-named fifth impedance means;
(i) said second current carrying path means to maintain the transistor circuit current carrying state when said lamp burns out comprising said first diode, said means to connect said first diode to the collector of said first transistor, said third impedance means and said positive voltage fourth source.

20. The transistor circuit of claim 14 wherein:
(a) said first impedance means comprises a first resistor and a second resistor and said voltage divider network further comprises a lamp;
(b) means to connect said first and second resistors and said lamp in series;
(c) the junction between the said first and second resistors is said impedance first point of connection;
(d) the junction between said second resistor and said lamp is said impedance second point of connection;
(e) said first voltage source is a source of negative voltage connected to one end of said first resistor of magnitude to substantially cut-off current flow of said transistor circuit;
(f) said second voltage source is a source of positive voltage connected to said lamp on the side opposite its second resistor connected side of magnitude in the absence of substantial current flow through said lamp to apply sufficient voltage to charge said voltage storing device so that said voltage storing device upon connection to said transistor triggers said transistor circuit to shift it to current flow state;
(g) said voltage storing device is a capacitor and said means to connect said voltage storing device to a source of reference voltage is a means to ground one end of said capacitor;
(h) said transistor comprises a collector and a base;
(i) said means to connect said voltage storing device comprises a switch contact connectible from the ungrounded side of said capacitor selectively to the junction between said first and second resistors, and said base of said transistor;
(j) a third resistor and means to connect said third resistor between the collector of said transistor and the junction between said second resistor and said lamp;
(k) said switch contact when connecting the capacitor to the base of said transistor in operative relationship thereby enabling said triggering of said transistor to selectively On or Off state in accordance with the voltage stored on said capacitor at the time of actuating the switch contact to the capacitor connected operative relationship position, the capacitor being charged to successive negative and positive potentials in accordance with the current flow condition of said third resistor which is connected between the collector of said transistor and the junction of said second resistor and said lamp of said voltage divider.

21. A flip-flop circuit comprising:
(a) a switch having a switch contact means;
(b) a first NPN and a second complementary PNP transistor, each comprising a control element;
(c) a voltage divider network comprising a first polarity voltage source, a first and a second impedance means and a second polarity voltage source connected in series;
(d) a voltage storing network comprising a source of reference voltage and a voltage storing means connected to said reference voltage and means to connect said voltage storing means to said switch contact means;
(e) said switch further comprising means responsive selectively to momentary actuating or to releasing of the switch to accordingly cause said switch contact means to connect said voltage storing means, between said source of reference voltage and either the control element of one of said transistors in switch actuating position, or the junction between said first and second impedance means in normal released switch position;
(f) circuit means operating initially before actuating said switch to maintain both of said transistors in Off condition;
(g) means to couple one of said transistors to the junction of said second impedance means and said second polarity voltage source such that in transistor Off condition said second polarity is applied through said second impedance and said normally released switch contact means to said voltage storing device to charge storing device accordingly to a voltage of second polarity and of magnitude to turn On the transistor having the control element to which it is connected when in momentary actuating switch contact position; and (h) feedback means and first and second transistor coupling means to sustain said transistors in On state upon triggering On of said control element of said one transistor and to sustain said transistors in Off state upon triggering Off of said control elements of said one transistor;

(i) said last-named one transistor upon turning On causing a changed current flow through said means to couple one of said transistors to the junction of said second impedance means and said second polarity voltage source to apply a voltage of first polarity and of magnitude to said voltage storage means in switch release position of said switch contact sufficient to turn Off the transistor having the control element to which it is connected in momentary actuating switch contact position;

(j) subsequent actuating of said switch to second switch contact position to momentarily connect said voltage storing means, when charged to said first polarity voltage, to said control element of said one transistor causing turn Off of said last-named one transistor and successive intermittent actuating and releasing of said switch alternately charging said storage means to said second polarity and first polarity voltages and alternately turning the flip-flop On and Off.

References Cited

UNITED STATES PATENTS

| | | | |
|---|---|---|---|
| 3,218,477 | 11/1965 | Sharp | 328—196 X |
| 3,324,306 | 6/1967 | Lockwood | 328—196 X |
| 3,025,415 | 3/1962 | Clapper | 307—288 X |
| 3,121,802 | 2/1964 | Palmer | 307—288 |
| 3,287,577 | 11/1966 | Hung et al. | 307—288 X |
| 3,392,290 | 7/1968 | Von Feldt | 307—288 |

DONALD FORRER, Primary Examiner

J. D. FREW, Assistant Examiner

U.S. Cl. X.R.

307—255, 292, 288, 313